United States Patent [19]
Pena

[11] 4,374,508
[45] Feb. 22, 1983

[54] FUEL SAVER SYSTEM FOR INTERNAL COMBUSTION ENGINES

[76] Inventor: Blas D. Pena, Monterrey, N.L., Mexico

[21] Appl. No.: 159,163

[22] Filed: Jun. 13, 1980

[51] Int. Cl.³ .................................................. F02M 25/04
[52] U.S. Cl. .............................. 123/25 E; 123/198 A; 123/524
[58] Field of Search .................. 261/102, 104, 36 A; 123/522, 523, 524, 25 E, 25 A, 1 A, 198 A

[56] References Cited

U.S. PATENT DOCUMENTS

| | | | |
|---|---|---|---|
| 2,262,013 | 11/1941 | Lang | 123/523 |
| 2,668,522 | 2/1954 | Hickok | 123/1 A |
| 2,843,216 | 7/1958 | Powell | 123/25 A |
| 3,411,489 | 11/1968 | Kruger | 123/523 |
| 3,722,837 | 3/1973 | Dapprich | 261/105 |
| 3,864,105 | 2/1975 | Davis | 261/36 A |
| 3,872,191 | 3/1975 | Walcker | 261/105 |
| 3,991,724 | 11/1976 | Geiser | 123/25 A |
| 4,068,625 | 1/1978 | Brown | 123/25 A |
| 4,197,820 | 4/1980 | Trudel | 123/523 |
| 4,205,591 | 2/1980 | Dawson | 123/523 |
| 4,306,520 | 12/1981 | Slaton | 123/25 E |

Primary Examiner—Ronald H. Lazarus
Attorney, Agent, or Firm—McGlew and Tuttle

[57] ABSTRACT

An arrangement and method is disclosed for improving the fuel economy of an internal combustion engine of the type having a carburetor for mixing a fuel with air, in which the air is saturated with a mixture of ether, alcohol and water.

3 Claims, 1 Drawing Figure

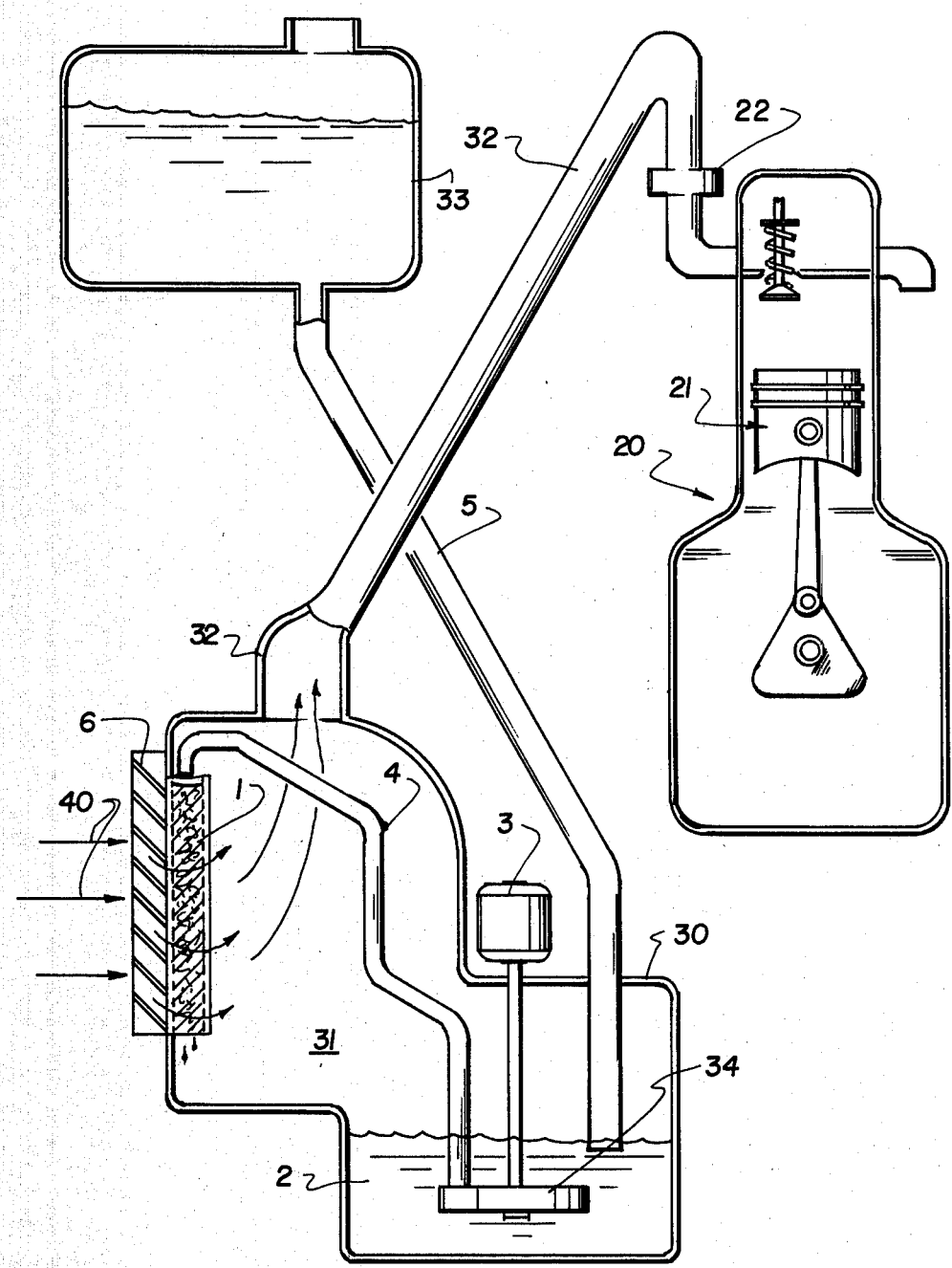

FUEL SAVER SYSTEM FOR INTERNAL COMBUSTION ENGINES

FIELD AND BACKGROUND OF THE INVENTION

This invention relates, in general, to internal combustion engines and, more particularly, to a new and useful arrangement for improving the fuel economy of internal combustion engines of the type having a carburetor for mixing a liquid fuel with air, and an improved method of carburization.

SUMMARY OF THE INVENTION

It is an object of the invention to provide a fuel economy arrangement for internal combustion engines thereby reducing the consumption of a liquid fuel such as gasoline by the engine.

In accordance with the invention, air saturated with a mixture of ether, alcohol and water is fed to the carburetor.

The inventive arrangement includes a filter apparatus which is continuously washed with a liquid mixture of ether, alcohol and water in order to saturate combustion air passed through the filter with vapor from that liquid mixture of either, alcohol and water and then feed the so saturated air to the engine's carburetor.

The inventive arrangement includes a liquid circuit in order for irrigating the filter, a reservoir for the liquid mixture and a centrifugal pump, electric motor and associated tubing.

The moistened air with the mixture of ether, alcohol and water, acts like a fuel and effects a substantial gasoline savings in the course of the usual work of the engine.

The liquid circuit and pipe line including the filter are placed in a housing which has dual purpose: to conduct the moistened air to the engine's carburetor using a pipe or hose, and to house the filter assembly.

In accordance with the invention a device for improving the fuel economy of an internal combustion engine of the type having a carburetor for mixing a liquid fuel with air includes a housing having a chamber, filter means for passing combustion air into the chamber, the housing including a reservoir section for containing a mixture of ether, alcohol and water, pump means communicating with the reservoir section for passing the mixture to the filter to saturate combustion air passing therethrough, and a conduit connecting the chamber to the carburetor for passing the saturated air to the carburetor.

It is a further object of the invention to provide in a method of carburetion of a liquid fuel with air for use in an internal combustion engine, the improvement comprising the step of saturating the air with a mixture of ether, alcohol and water. In accordance with a preferred embodiment of the inventive technique, the mixture has proportionate amounts of ether, alcohol and water in the proportion of 1:10:1000.

It is still a further object of the invention to provide a device for improving fuel economy of an internal combustion engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The sole FIGURE of the drawing is a schematic representation of a device according to the invention interconnected to an internal combustion engine.

DESCRIPTION OF THE PREFERRED EMBODIMENT

Referring to the sole FIGURE, there is shown an internal combustion engine 20 having a piston assembly 21 and a carburetor 22 operatively connected thereto in a well known manner.

In accordance with the invention, there is provided a housing 30 having a chamber 31. The chamber 31 is adapted to maintain a liquid reservoir 2 as described hereafter. The housing 30 is provided with a filter 1, in it walls, for the passage of combustion air into the chamber 31. In opening 32 in the upper portion of the housing 30 affords fluid communication in the chamber to a conduit 32 which interconnects the housing, from the opening 32 to the carburetor 22.

The chamber has a reservoir section 2 adapted to contain a mixture of alcohol, ether and water. The centrifugal pump 34, provided with an electric drive motor 3 is provided at the reservoir section 2, in fluid communication with the liquid mixture therein. A line 4 connects the discharge of the pump 3 to the filter 1. The discharge end 4 is disposed above the filter 1 so that fluid pumped from the reservoir section 2 will wash the filter and thereby saturate the air passing therethrough. A container 33, disposed outside of the housing, is connected in fluid communication with the reservoir section 2 via a line 5 to fill and replenish the liquid mixture in the reservoir section. A device 6, such as a deflector, may be disposed in front of the filter 1 to preclude the possibility that liquid from the filter will pass to the outside of the housing.

In operation, combustion air passes through the filter 1 as is illustrated by the arrows 40. The electric drive motor 3 is disposed outside of the housing 30. The electric drive motor is preferably energized, when the engine is started, to cause the pump 34 to continuously pass a flow of the liquid mixture from the reservoir section 2 to the filter. Air passing through the filter is thereby saturated with a mixture of ether, alcohol and water. The saturated air passes through the pipeline to carburetor 22 for mixing with the liquid fuel in a well known manner.

It is preferred that the liquid mixture of ether, alcohol and water be provided in a proportion of 1:10:1000. Thus, an exemplary mixture would include one cubic centimeter of ether, 10 cubic centimeters of alcohol and 1000 cubic centimeters of potable water.

While a specific embodiment of the invention has been shown and described in detail to illustrate the application of the principles of the invention, it will be understood that the invention may be embodied otherwise without departing from such principles.

What is claimed is:

1. A device for improving the fuel economy of an internal combustion engine of the type having a carburetor for mixing a liquid fuel with combustion air comprising, a housing having a chamber, filter means for passing combustion air into said chamber, said housing including a reservoir section for containing a mixture of ether, alcohol and water in a ratio of about 1 part ether to 10 parts alcohol to 1000 parts water, pump means communicating with said reservoir section for passing the mixture to said filter to saturate combustion air passing therethrough, and a conduit connecting said chamber to the carburetor for passing the saturated air to the carburetor.

2. A method of treating combustion air for use in an internal combustion engine having a carburetor for mixing the air with fuel and using a housing having a chamber with a reservoir containing a mixture of about 1 part ether, 10 parts alcohol and 1000 parts water, which chamber is connected to the engine carburetor and which has an opening for the passage of air therethrough to the engine and a filter disposed at the opening for filtering the air, comprising: directing the combustion air through the filter and into the chamber while simultaneously passing the mixture through the filter so as to cause the air passing therethrough to become saturated with the mixture.

3. A method according to claim 2, wherein the air passing through the filter also passes in the chamber containing the mixture and including continuously pumping the mixture in the reservoir to the top of the filter.

* * * * *